Figure 1:
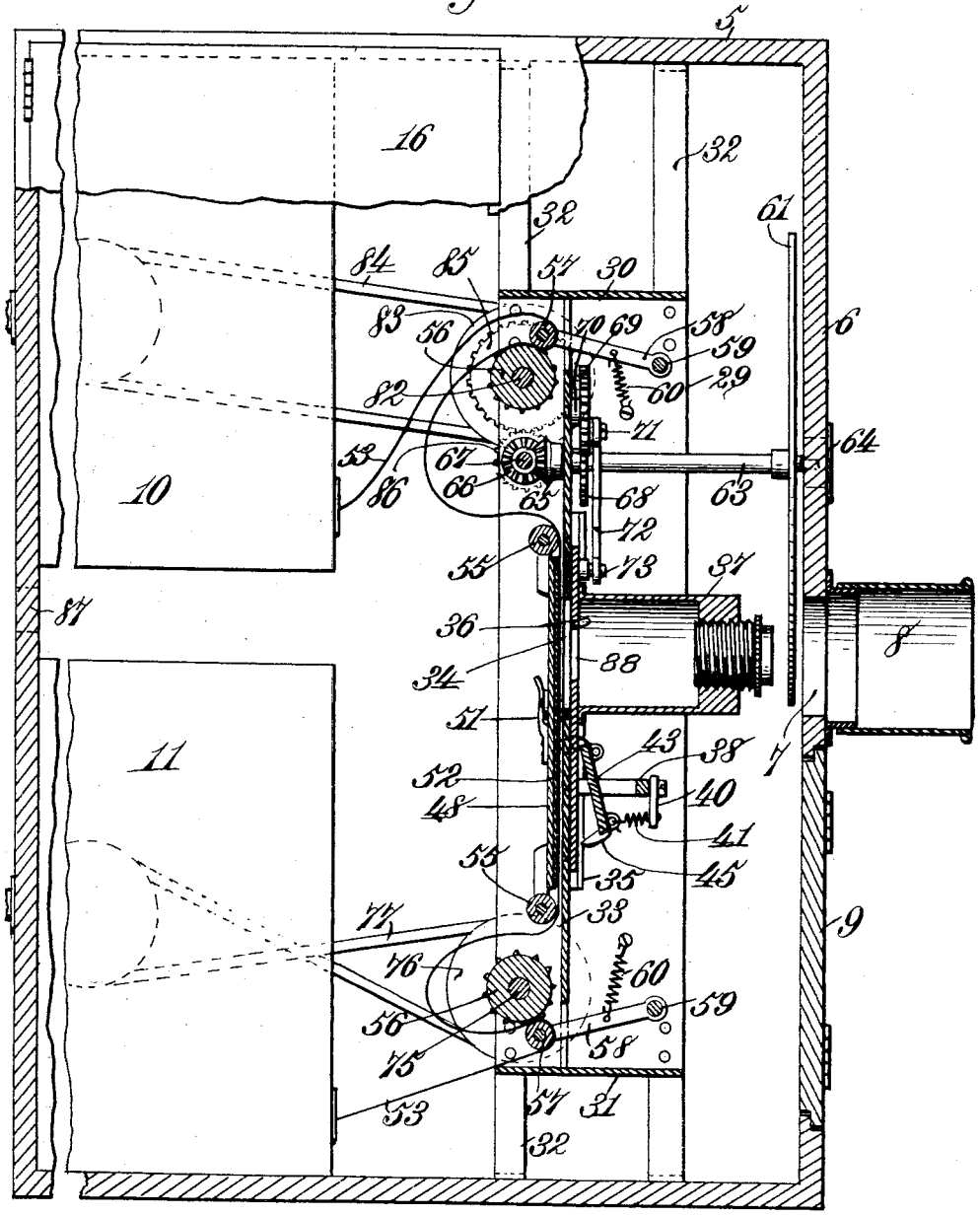

R. A. GAMBLE & E. T. OGDEN.
MOTION PICTURE MACHINE.
APPLICATION FILED APR. 15, 1911.

1,182,761.

Patented May 9, 1916.
3 SHEETS—SHEET 1.

Witnesses.
Robert Everitt.

Inventors.
Robert A. Gamble.
Edgar T. Ogden.
By
Atty.

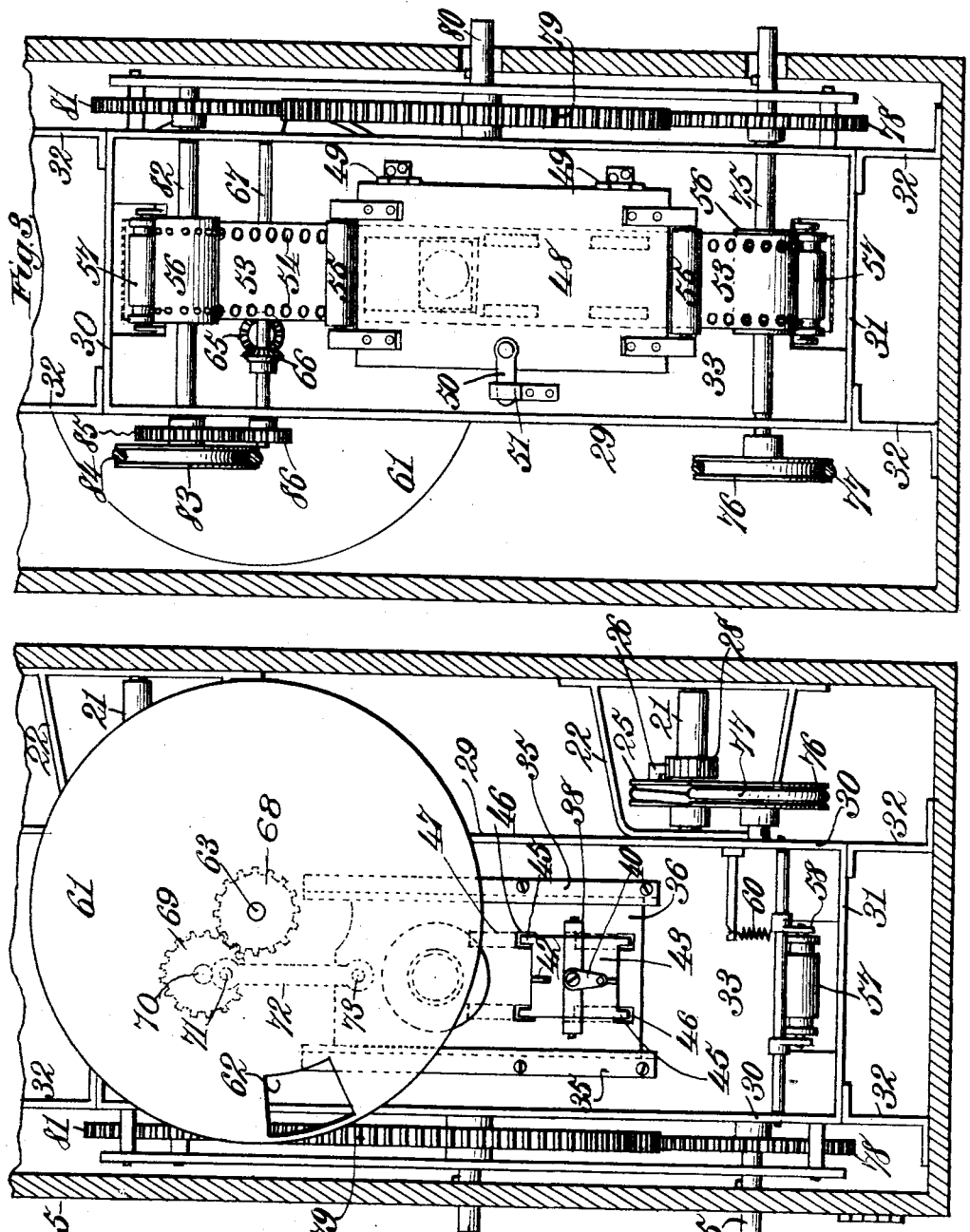

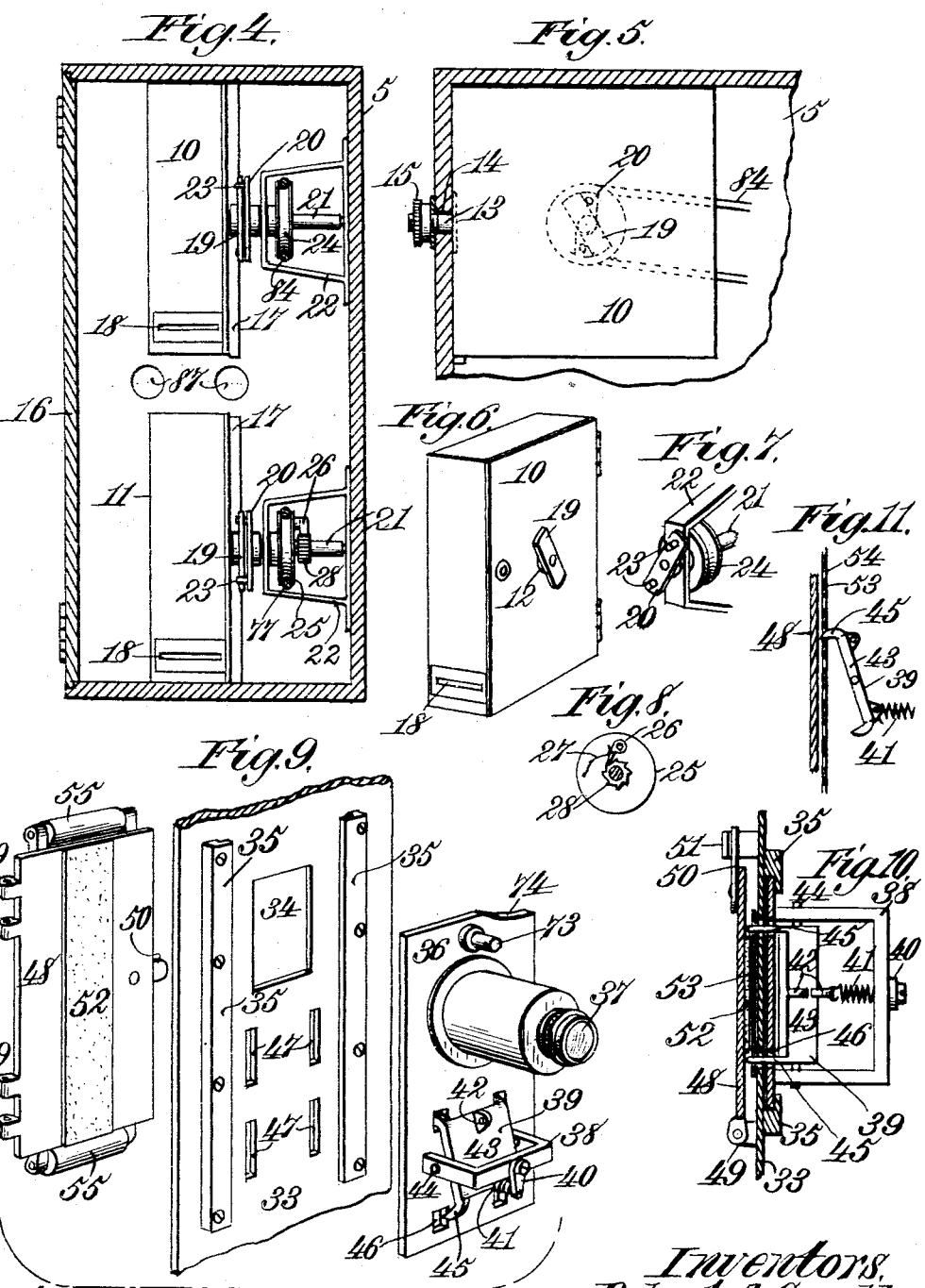

UNITED STATES PATENT OFFICE.

ROBERT A. GAMBLE AND EDGAR T. OGDEN, OF PETERSBURG, VIRGINIA.

MOTION-PICTURE MACHINE.

1,182,761.   Specification of Letters Patent.   Patented May 9, 1916.

Application filed April 15, 1911. Serial No. 621,319.

*To all whom it may concern:*

Be it known that we, ROBERT A. GAMBLE and EDGAR T. OGDEN, citizens of the United States, residing at Petersburg, in the county of Dinwiddie and State of Virginia, have invented new and useful Improvements in Motion-Picture Machines, of which the following is a specification.

This invention relates to motion picture machines, and though primarily intended for use as a camera, the invention may be applied to a projecting apparatus for the display of motion pictures whether the latter be produced by a camera constructed in accordance with the present invention or by a camera of a different type.

In one class of motion picture machines as ordinarily constructed and arranged the film has a rapid feeding movement imparted thereto in one direction while the shutter is closed, and then this motion of the film is arrested while the shutter is opened and the exposure made, the lens being fixed to the machine casing or box so as to retain its relation to the film during the short period of exposure. In another class of motion picture machines the film has a rapid feeding movement and the lens is also moved during the exposure, but the rate of speed of movement of the film and lens differs or is not identical.

The present invention in its broadest aspect consists of a film and a lens moved uniformly or identically at the same rate of speed while the exposure is made.

The invention further consists of a film and lens moving identically at the same rate of speed during exposure of the film and a cessation of movement of the film immediately subsequent to an exposure.

The invention further consists of a film and lens moving uniformly or identically at the same rate of speed during exposure of the film and a cessation of movement of the film immediately subsequent to an exposure while the lens continues to move.

The invention still further consists in the construction and arrangement of the several parts and combination of elements which will be more fully hereinafter described and claimed.

The drawings illustrate one practical embodiment of the invention, but it will be understood that the invention is not limited to the construction shown, as many variations and changes may be adopted within the scope of the appended claims.

In the drawings: Figure 1 is a longitudinal vertical section of a motion picture machine embodying the features of the invention and shown partially broken away. Fig. 2 is a transverse vertical section through the machine taken immediately in advance of the shutter or light excluding means. Fig. 3 is a transverse vertical section through the machine taken in rear of the film feeding and holding devices and in advance of the dark boxes or magazines. Fig. 4 is a transverse vertical section through the rear of the machine looking toward the front ends of the dark boxes or magazines. Fig. 5 is a detail longitudinal section showing one of the dark boxes or magazines and particularly illustrating the means for holding the same in positive association with the back of the casing or inclosure. Fig. 6 is a detail perspective view of one of the dark boxes or magazines. Fig. 7 is a detail perspective view of the operating mechanism for direct engagement with the spool shaft or spindle of the dark box or magazine as shown by Fig. 6. Fig. 8 is a detail view particularly showing ratchet mechanism coöperating with the mechanism for actuating the shaft or spindle of one of the dark boxes or magazines. Fig. 9 illustrates perspective views of a portion of the interior frame serving as a diaphragm or frame-up device, the lens slide and lens and means for controlling the movement of the film, and the film retention or holding means. Fig. 10 is a horizontal section through the lens slide below the plane of the lens, the frame on which the lens slide has movement, the film retention or holding means and the film to illustrate the relative association of the said parts during the feeding operation or movement of the film. Fig. 11 is a detail section particularly illustrating the means for controlling the feeding movement of the film and its positive association with the film.

Referring to the drawings, the numeral 5 designates a casing or inclosure of any suitable material and of box-like structure.

In the front 6 of the casing an opening 7 is formed over which is mounted a forwardly projecting tubular member 8 constituting a hood for a lens which will be presently explained. Below the tubular member or hood 8 the front or panel 6 is provided with a door 9 to gain access to the interior of the machine for the purpose of adjusting the lens and other mechanisms without disturbing the remainder of the machine organization.

Within the rear portion of the casing are two dark boxes or magazines 10 and 11, either of which may be used for housing the unexposed film and the other will then be used to receive the film as exposed, these dark boxes being provided with suitable reels or spools for carrying the film and each having a shaft or spindle 12 projecting at one extremity outwardly through one side of the box or magazine. The boxes or magazines 10 and 11, as particularly shown by Figs. 1 and 4, are arranged respectively in the upper and lower portions of the casing and in vertical alinement and are removably held in fixed position within the casing by stems 13 projecting from the rear ends thereof, one on each, and through openings 14 in the rear side of the casing and are engaged by draw or clamping nuts 15. By detaching the draw or clamping nuts 15 the dark boxes or magazines may be readily removed from the interior of the casing through a door 16 at one side, the said door giving access to the rear portion of the casing. The dark boxes or magazines 10 and 11 are applied against vertically disposed ribs or stops 17 which are in vertical alinement and not only serve to assist in holding the said boxes in steady position within the casing, but also as means for arranging the boxes in true vertical alinement. The boxes 10 and 11 are also provided with the usual film slots 18 in their lower portions, one slot being formed in each box as shown by Fig. 4, and it will also be understood that access will be had to the interior of the boxes in the usual manner, for instance by a hinged side as shown by Fig. 6. The dark boxes or magazines will also be provided with suitable safeguards for preventing access of actinic light to the sensitive film, but since these parts are not included in the present invention they have not been illustrated. The outer projecting extremity of each shaft or spindle 12 has a clutch head 19 secured thereon and of substantially rectangular form, and separably coöperating therewith is a clutch head 20 fixed on the end of an operating or driving shaft 21 supported by and having bearing in a bracket 22 secured to the side of the casing opposite the side of each dark box or magazine from which the shaft or spindle 12 projects. The clutch head 20, as clearly shown in detail by Fig. 7, is also of approximately rectangular form and has two pins 23 projecting therefrom adjacent to the ends of the same and adapted to engage the opposite side edges of the head 19, the operative engagement of the clutch heads 19 and 20 being positively maintained when the dark boxes or magazines 10 and 11 are secured in place in the machine casing. Fixed on the upper shaft 21 is a grooved band pulley or analogous device 24 and loosely mounted on the lower shaft 21 is a similar band pulley 25 carrying a pawl 26 engaged by a spring 27 and held in mesh with a ratchet wheel 28 fixed or keyed to the said lower shaft 21. By this means the dark boxes or magazines 10 and 11 may serve either as film feeding or film receiving inclosures; that is, the upper box may contain the unexposed film and the lower box the exposed film, or vice versa, without changing the direction of rotation of the main driving mechanism of the machine. It will be understood that when the unexposed film is fed or paid out from the lower box or magazine 11 the pawl 26 will slip over the ratchet wheel 28, and when the said lower box serves as the receiver for the exposed film the pawl or ratchet mechanism just specified will have a reverse operation. It will be understood that the clutch heads 19 and 20 may be readily separated or associated in removing the boxes or magazines from or resetting them in the casing of the machine.

Within the front portion of the casing 5 is a supporting frame 29 carrying the several mechanisms for propelling or feeding a film, actuating the shutter, and moving the lens in a manner which will be presently described. This frame 29, as particularly shown by Fig. 3, comprises closed sides and upper and lower ends 30 and 31 and has legs or braces 32 secured to the ends 31 and the bottom and top of the casing respectively to maintain the frame in stable position. The front and rear portions of the frame 29 are open, and at a suitable distance from the front edge of the frame a vertical partition 33 is fixed in the latter and in part serves as a fixed frame-up device or diagram and for this purpose is formed with a rectangular opening 34, as clearly shown by Fig. 9. On the front side of the diaphragm 33 vertical guides 35 are secured to receive a reciprocating lens slide 36 carrying a lens 37, preferably of the universal type, the lens 37 being fixed to the slide by any suitable means. The slide 36 below the lens 37 carries a film feed controller embodying a forwardly projecting yoke 38, a claw member or film engaging means 39 fulcrumed between the side members of the yoke, a reversible spring attaching arm 40, and a spring 41 secured at its forward extremity to the free end of the arm 40 and at its rear extremity adapted to engage either one of two apertured lugs 42 situated at the upper and lower portions of the center of the claw member or film engaging means 39. The claw member or film engaging means 39 preferably comprises a body plate 43, from the center of the opposite side edges of which fulcrum pins 44 project and movably extend into the sides of the yoke 38, and at the upper and lower corner portions of the plate 43 are rearwardly projecting claws 45 which extend through openings 46 in the slide 36, there being one pair of claws engaging the adjacent openings 46 therefor while the remaining pair of claws 45 is drawn forwardly and yieldingly maintained in forward position by the tension of the spring 41. The claw member or film engaging means 39 has a rocking movement or adjustment to render the same reversible in its operation relatively to the film, and when it is desired to propel or feed the film downwardly the upper pair of claws 45 is projected through its openings 46 and the spring 45 is attached to the lower lug 42. To reverse the movement or adjustment of the claw member or film engaging means, the spring 41 is detached from the lower lug 42 and the arm 40 loosened and turned upwardly and the said spring attached to the upper lug 42, thereby drawing the upper pair of claws 45 forwardly through the openings 46 and forcing the lower pair of claws rearwardly through corresponding openings 46 therefor, and by the latter arrangement the film will be propelled or fed upwardly. The claws 45 are long enough to project through the partition 33 and pairs of elongated slots 47 are formed in parallel relation in the partition 33 to permit the claws to project through the latter and compensate for the vertical reciprocation thereof with the lens slide 36, the free ends of the claws being shaped in such manner as to readily move over the film without injury to the said film during the intervals between the propelling or feeding operations, which will be more fully hereinafter described. Against the back portion of the partition 33 or of the part of the latter which forms the frame-up device or diaphragm and having the opening 34 and slots 47 therein, a film holding or retention device is movably applied and consists of an imperforate plate 48 having attaching hinge means 49 at one side edge so as to permit the plate to swing on the partition 33 and a latch means 50 projecting from the opposite side edge to engage a suitable keeper 51 secured to the partition, the latch means and keeper serving to hold the plate 48 in tight or close engagement with the back of the partition. On the front side of the plate 48 and extending full length of the center thereof is a pad strip 52 of suitable material and of a width less than the width of the film, the said pad strip serving to press the film, which is designated by the numeral 53, closely against the back of the partition 33 over the opening 34 and slots 47. The free end of the claws 45 projecting through the slots 47 clear the opposite side edges of the pad 52 and terminally bear against the plate 48 adjacent to the opposte side edges of said pad with considerable firmness. The feeding or sprocket apertures 54 adjacent to the opposite side edges of the film 53 are engaged by the claws 45 projected rearwardly into operative position relatively to the said film, the pad 52 engaging the film between the feeding or sprocket apertures 54, and as the lens slide 36 reciprocates, the claws 45 alternately engage a pair of the apertures 54 and are released from the latter and take hold and engage in another pair of the said apertures, the claws when moving in one direction slipping over the portions of the film between the apertures engaged, and during the operation of the claw member or film engaging means the release of the pair of claws working in conjunction with the film from one pair of apertures 54 and movement of said claws over opposite portions of the film to engage another pair of apertures are effected against the resistance of the spring 41. At the upper and lower ends of the film holding or retention device and carried by the plate 48 are antifrictional rollers 55, preferably constructed of suitable vitreous material over which the film has movement to ease the feed or propulsion of the same without liability of injury thereto.

The film 53 coöperates with upper and lower loop forming mechanism consisting essentially of a feed sprocket 56 and a direction roller 57 carried on the free end of a tension arm 58 fulcrumed at its forward end as at 59 and having a tension spring 60 connected thereto, the spring 60 serving to pull the arm 58 downwardly or upwardly in accordance with the upper or lower position of the loop forming mechanism to hold the roller 57 in close association with the sprocket 56 and insure a positive registration of the sprocket apertures of the film with the said sprocket. The purpose of providing the loop forming mechanism both above and below the film engaging means 39 or the means for positively propelling or feeding the film at identically the same rate of speed as the movement of the lens slide is to provide for a reversal of movement of the film. The function of the loop forming mechanism and the puspose of producing the loops as specified will be readily understood as being to protect the film against fracture by providing sufficient slackness to compensate for any jerking action that may ensue due to the intermittent operation of the claw member or film engaging means 39 in either direction of propulsion or feed of the film.

In the front portion of the casing between the lens 37 and the opening 7 in the front panel 6, a rotatable disk shutter 61 is mounted and formed with a single exposure opening 62, as clearly shown by Fig. 2. The rotatable disk shutter 61 is of such dimensions that it will operate with exactness in relation to the movement of the lens 37 and the film 53 to bring the exposure opening 62 thereof over or in registration with the lens and the opening 7 precisely at the time that the exposure is to be made and during the movement of the lens and the film. The shutter 61 is fixed on a shaft 63 having its front end mounted in a suitable bearing 64 in the front panel 6 and its rear extremity bearing in the upper portion of the partition 33 and provided with a bevel pinion 65 meshing with a corresponding pinion 66 keyed on a shaft 67 projecting through and bearing in the sides 30 of the frame 29. On the shaft 63 in advance of and close to the partition 33 a spur gear 68 is keyed and continually meshes with a corresponding gear 69 rotatably mounted on the stud 70 projecting forwardly from the upper portion of the partition 33 and provided with an eccentric pin 71. The gear 69 is practically a crank wheel or disk formed with a toothed edge, and extending from the pin 71 thereof is a rigid connecting bar or link 72 which is also movably attached at its lower end to a stud 73 projecting outwardly from the top central portion of the lens slide 36, the latter having one upper corner cut away, as at 74, to avoid contact with the gear 68 during the vertical reciprocation of said slide. In one side of the casing the main driving mechanism is mounted and may be operated from either one of two points, and said mechanism will now be fully explained.

Projecting through one side of the casing and having bearing in the opposite sides 30 of the frame 29 is a shaft 75 on which the lower sprocket 56 is keyed and having on its inner end within the casing a belt wheel 76 over which a belt 77 is trained and engages the pulley 25 of the lower shaft 21 for driving the shaft 12 of the reel or spool of the lower dark box or magazine 11, the said belt 77 being crossed for obvious reasons. On the shaft 75 close to the side of the casing through which it projects a spur gear 78 is keyed and maintained in continual mesh with an intermediate transmission gear 79 of considerably greater dimensions and keyed on a stub shaft 80 mounted in suitable bearings and also projecting through the same side of the casing through which the shaft 75 extends. The transmission gear 79 is held in mesh with an upper gear 81 similar in dimensions to the lower gear 78 and keyed on a shaft 82 having bearing in the opposite sides 30 of the frame 29 and carrying the upper sprocket 56. The projecting ends of the shafts 75 and 80 are adapted to be removably engaged by a suitable operating crank, the crank being applied to the shaft 75 when it is desired to operate the machine under normal conditions and to the shaft 80 when it is desired to produce trick pictures or where inanimate objects appear to be endowed with the power of motion, such difference in operation being due to the variation in the sizes of the gears 78 and 79. It will be understood that the shafts 75 and 82 have the same rate of speed imparted thereto by the actuation of the mechanism from the shaft 75 and owing to the interposed gear 79, and it will be further understood that the gearing generally and all the operating mechanism will be so proportioned and timed as to obtain the necessary speed of the relative parts and particularly the operation of the lens slide and the shutter and the consequent propulsion or feed of the film. On the inner end of the shaft 82 a band pulley 83 is mounted and is engaged by a belt 84 which is trained over the pulley 24 on the upper shaft 21 for operating the reel or spool of the upper dark box or magazine 10. Adjacent to the band pulley 83 the shaft 82 also has a gear 85 keyed thereto and held in mesh with a pinion 86 on the adjacent end of the shaft 67 and by means of which the bevel pinions 66 and 65 are operated to actuate the shaft 63 and the lens slide 36 through the gears 68 and 69. It will be understood that the sprockets 56 will be of the drum type having studs projecting regularly therefrom adjacent to opposite ends, and the rollers 57 will bear on the film between the studs and hence insure an accurate registration of the studs with the apertures in the film therefor.

In the back of the casing two openings 87 are formed and spaced a distance apart equal to the normal human pupillary distance so that the operator may apply the eyes to said openings for focusing the lens and the machine as an entirety, the said openings being in alinement with the opening 34 and with the optical axis of the lens during exposure. In focusing operations the hinged film holding or retention device or the gate 48, which is in the form of a plate of suitable dimensions, is opened and a portion of the film thereby exposed and the object may then be readily focused upon the film then visible, the translucent film serving as an excellent focusing medium and the small section of film thus wasted being immaterial. The image or object having been properly focused in the manner just explained or by any other means that may be desired, the film holding or retention device is then closed against the back of the partition 33 and the machine is ready for operation.

Assuming that the motion pictures are to be taken in the usual manner at comparatively high speed, the operating crank is applied to the shaft 75 and the latter rotated and through the mechanism hereinbefore explained, the lens slide carrying the lens and the claw member or film engaging means 39, the film, and the shutter 61 will be set in motion and simultaneously the reels of the dark boxes or magazines as well as the looping mechanism, including the sprockets 56, will be actuated. If the motion of the film is downward while traversing the optical axis of the lens, the film is protected from the light during the upward movement of the lens. As soon as the lens 37 starts to move downward the film 53 is caused to move in a similar manner at exactly the same rate of speed as the speed of movement of the lens by the claw member or film engaging means 39 and while the lens and film are moving downwardly and prior to the release of the claw member or film engaging means 39 from the film the shutter 61 will be regularly rotated and just at the instant that registration ensues between an opening 88 in the lens slide 36 (which is in alinement with the focal plane of the lens) and the opening 34 in the partition 33, the exposure opening 62 of the shutter will fully uncover the lens and thus permit a beam of light to reach the sensitive surface of the film. Before the downward movement of the lens ceases, the opening 62 of the shutter will have passed beyond the optical axis of the lens and the beam of light is cut off. During the remainder of the movement of the lens in a reverse or upward direction the beam of light is prevented from reaching the sensitive surface of the film by the opaque portion of the shutter then moving over the optical axis of the lens. Immediately subsequent to the exposure and while the opaque portion of the shutter is over the optical axis of the lens, the claw member or film engaging means 39 is automatically released from the portion of the film with which it has been in engagement and rises with the lens slide to engage a new portion of the film for a subsequent exposure, and during these intervals between the disengagement and engagement of the claw member or film engaging means relatively to the film, the latter is stationary while the lens continues to move and during such time the beam of light is shut off from or prevented from entering the lens by the shutter. If the propelling or feeding action of the film is reversed by changing the position of the claw member or film engaging means 39, the same operation will ensue as to exposure of the film.

The opening in the shutter is suitably proportioned to the opaque portion of the shutter so that the period of activity of the lens during its movement with and at the same rate of speed as the progressive movement of the film shall be such that the displacement of the image due to such movement of the lens will be practically insensible to the observer.

What is claimed as new is:

1. In a motion picture machine, a film actuating mechanism, a reciprocable lens, means for moving the lens with and at identically the same rate of speed as the film, means for reversing the direction of movement of the film independently of the movement of the lens, and means for exposing the film to light through the lens during the movement of the latter and the film.

2. In a motion picture machine, a film actuating mechanism, means for reversing the motion of the film so as to cause it to feed in either one of two directions, a reciprocable lens, means for moving the lens with the film, and means for exposing the film to light during the movement of the lens and film.

3. In a motion picture machine, a film actuating mechanism, means for reversing the propulsive movement of the film and for causing an intermittent check in the operation of the latter, a reciprocable lens, means for moving the lens with the film, and means for exposing the film to light through the lens during the movement of the lens and film.

4. In a motion picture machine, a film actuating mechanism, means for causing the film to have a propulsive movement in reverse directions, dual loop forming mechanisms coöperating with the film to permit reversal of propulsion thereof, a reciprocable lens, and means for moving the lens with the film at identically the same rate of speed.

5. The combination with a suitable casing having a light-aperture, of a film guide alongside said aperture, continuously moving means for feeding perforated film to said guide and drawing it therefrom, a lens arranged for reciprocating, in front of said aperture, in a path parallel to the film exposed at said aperture, and spring hooks carried by said frame and adapted in form and position to engage in the film perforations and advance the film when the frame moves in the direction of the film's normal feed and to slip along the film when the frame moves in a reverse direction.

6. In a kinetoscope, a lens arranged for reciprocation in a path parallel to the exposed portion of the film, a frame on which said lens is mounted, hooks carried by said frame, and means for actuating said hooks whereby they engage the film when the frame moves in the direction of the film's normal feed and are disengaged therefrom when said frame moves in the opposite direction.

In testimony whereof we have hereunto set our hands in presence of two subscribing witnesses.

ROBERT A. GAMBLE.
EDGAR T. OGDEN.

Witnesses:
JOSEPHINE S. GREGORY,
EDWARD W. BUTCHER.